(12) United States Patent
Siminoff et al.

(10) Patent No.: US 9,007,018 B2
(45) Date of Patent: Apr. 14, 2015

(54) PORTABLE DEVICE CHARGER

(71) Applicant: Edison Junior, LLC, Pacific Palisades, CA (US)

(72) Inventors: James Siminoff, Pacific Palisades, CA (US); John Modestine, Lansdale, PA (US)

(73) Assignee: Edison Junior, LLC, Pacific Palisades, CA (US)

( * ) Notice: Subject to any disclaimer, the term of this patent is extended or adjusted under 35 U.S.C. 154(b) by 353 days.

(21) Appl. No.: 13/656,953

(22) Filed: Oct. 22, 2012

(65) Prior Publication Data

US 2014/0111159 A1   Apr. 24, 2014

(51) Int. Cl.
*H02J 7/00* (2006.01)

(52) U.S. Cl.
CPC ............ *H02J 7/0042* (2013.01); *H02J 7/0047* (2013.01); *H02J 7/0054* (2013.01); *H02J 2007/0062* (2013.01)

(58) Field of Classification Search
USPC ................................. 320/107, 111
See application file for complete search history.

(56) References Cited

U.S. PATENT DOCUMENTS

| 5,939,858 | A  | * | 8/1999  | Dodd et al. | 320/107 |
|-----------|----|---|---------|-------------|---------|
| D456,026  | S  |   | 4/2002  | Goto        |         |
| D525,193  | S  |   | 7/2006  | Vu          |         |
| D542,279  | S  |   | 5/2007  | Chan        |         |
| 7,511,451 | B2 | * | 3/2009  | Pierce      | 320/103 |
| D602,430  | S  |   | 10/2009 | Green       |         |
| D602,615  | S  |   | 10/2009 | Liu         |         |
| 2003/0141840 | A1 | * | 7/2003  | Sanders  | 320/107 |
| 2006/0170393 | A1 | * | 8/2006  | Yang     | 320/107 |
| 2010/0231161 | A1 | * | 9/2010  | Brown    | 320/101 |

OTHER PUBLICATIONS

Notice of Allowance mailed on Jan. 2, 2013 in copending Design U.S. Appl. No. 29/435,226.

* cited by examiner

*Primary Examiner* — Samuel Berhanu

(57) ABSTRACT

A charger for charging electronic devices, including a top having a perforated portion and a housing, the housing including a rechargeable battery; one or more cables electrically coupled to the battery; one or more cable retractors; two or more legs extending from the housing supporting the charger on a surface; one or more windows arranged between the legs that extend only partially toward the surface such that the cables and a charging head may pass through the space between the windows and the surface when the cables are in an extended state.

5 Claims, 8 Drawing Sheets

PORTABLE DEVICE CHARGER

FIELD OF THE INVENTION

The invention relates to a portable charger for charging cellular phones and other portable consumer electronic devices.

BACKGROUND OF THE INVENTION

Portable electronic devices require power to operate and are typically powered by rechargeable batteries. Due to cost and design concerns, those batteries are of limited capacity and may require frequent recharging, sometimes multiple times per day and in places where AC power is not available or easily accessible.

Existing portable batteries may have only female adapter ports that require separate charging cords with male connectors to connect to the portable electronic device to be charged. Separate charging cords are inconvenient because they can become tangled or lost, often because the cables do not have a consistent storage space when not in use.

Existing portable device chargers may have retractable charging cord reels built into the housing, but those chargers lack batteries, so must be plugged into an AC outlet to charge a device, which solves the problem that the cords create, but does not resolve the portability component.

SUMMARY OF THE INVENTION

A charger for charging electronic devices, including a top having a perforated portion and a housing, the housing including a rechargeable battery contained within the housing; one or more cables electrically coupled to the battery and at least partially contained within the housing; one or more cable retractors contained within the housing for retracting a substantial portion of the one or more cables inside the housing via openings on a bottom surface of the housing, where an end of the cable includes a charging head that is not retracted into the housing; a power port on the bottom surface of the housing coupled to the rechargeable battery, the power port electrically and mechanically coupleable to an external electrical power source; two or more legs extending from the housing supporting the charger on a surface; one or more windows arranged between the legs that extend only partially toward the surface such that the cables and charging head may pass through the space between the windows and the surface when the cables are in an extended state, the windows formed of a material that is at least semi-transparent such that the charging heads are visible through the windows when the cables are in a refracted state; wherein the top is removably mechanically coupled to the housing, thereby forming a storage area accommodating at least one three-foot charging cable and one three-foot external power connector, and wherein the perforated portion of the top allows heat to pass outward from battery.

BRIEF DESCRIPTION OF THE DRAWINGS

The drawings presented herein are for the purposes of illustration, the invention is not limited to the precise arrangements and instrumentalities shown.

DETAILED DESCRIPTION OF THE INVENTION

Figure 1:
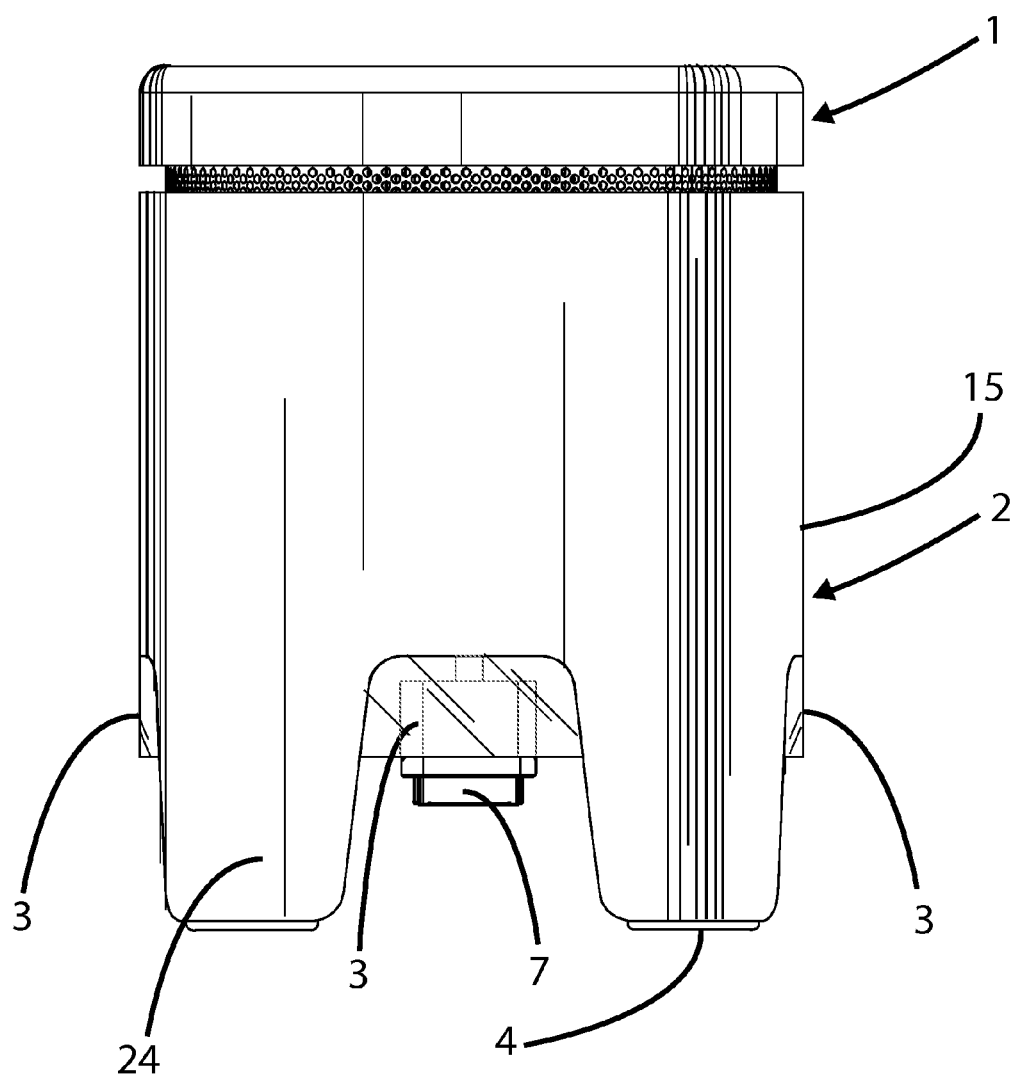
FIG. 1. represents a front view of mobile charging device according to an aspect of the present disclosure.

FIG. 1 shows a front view of mobile charging device according to an aspect of present disclosure. The mobile charging device may include Housing 2 and Top 1. Housing 2 may have Legs 24 which bring the bulk of the charging device off of the surface. Legs 24 may be sized and spaced to allow a user to access Dual Tip Charging Heads 7, for example by hand. Legs 24 may have Rubber Feet 4 so the device remains stationary. In one aspect according to the present disclosure, Housing 2 may have Housing Window 3 attached to Housing Wall 15. Housing Window 3 may be at least partially transparent, thereby allowing a user to locate Dual Tip Charging Heads 7 for access. Housing Window 3 may extend from the Housing 2 toward the surface, thereby advantageously protecting the electronic connectors on the bottom side of the charger, for example during inclement weather if the mobile charging device is to be used outdoors.

Figure 2:
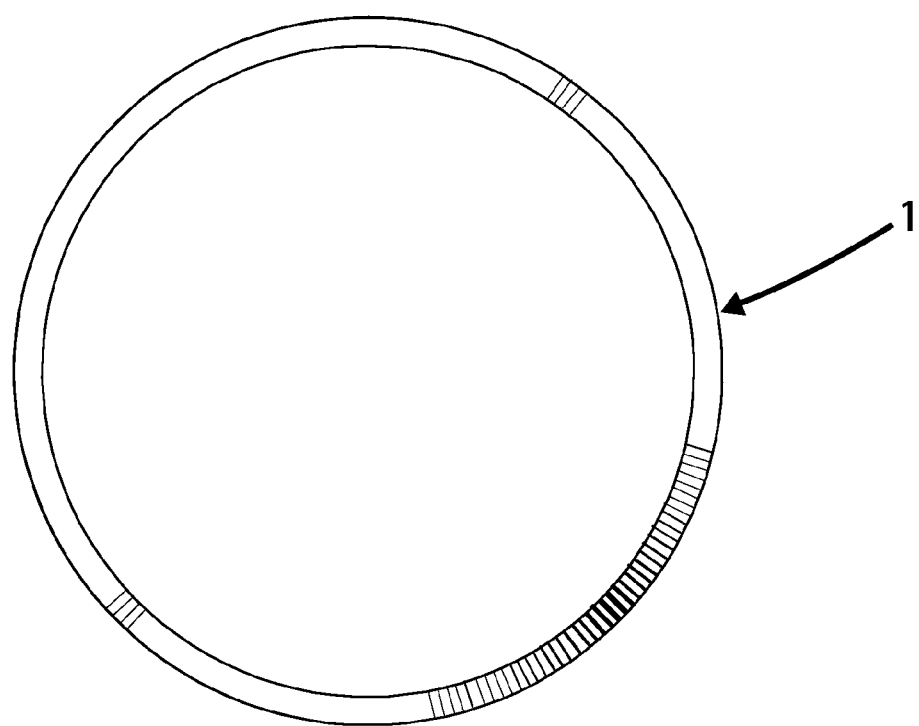
FIG. 2. represents a top view of mobile charging device according to an aspect of the present disclosure.

FIG. 2 shows a top view of Top 1. In one aspect, the mobile charging device may be 5.00 inches in diameter and 6.45 inches tall. The mobile charging device may be manufactured from injection molded ABS plastic or metal, such as aluminum.

Figure 3:
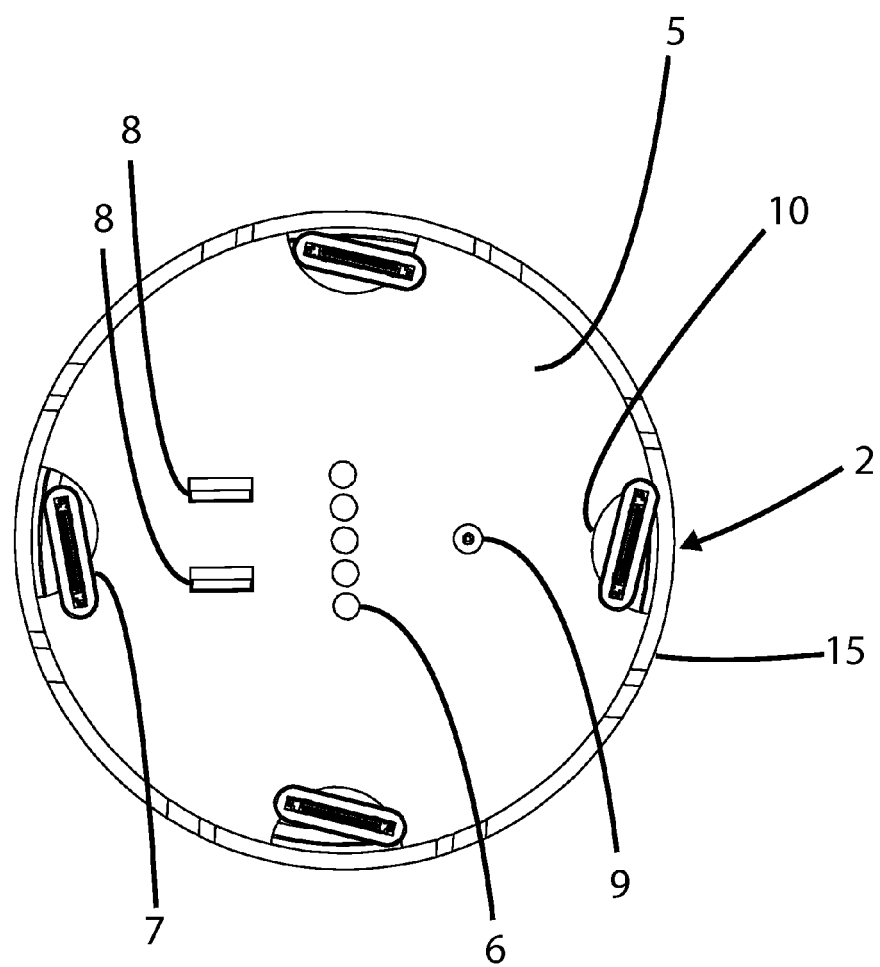
FIG. 3. represents a bottom view of mobile charging device according to an aspect of the present disclosure.

FIG. 3 shows the bottom view of mobile charging device according to an aspect of present disclosure. Under Carriage 5 attaches to Housing Wall 15 of Housing 2. On the bottom face of Under Carriage 5 is LED Indicator 6, which displays the charging status of the battery (not shown, described in more detail below) stored within Housing 2. The LED Indicator 6 indicates the level of charge stored within battery and/or when the battery is charging. AC Adaptor Port 9 may accept a standard 100/240 Volt AC adaptor to charge the battery through a wall circuit. Under Carriage 5 also houses two Downstream USB Port 8 which allows the user to charge devices from the battery through the use of an USB cord.

Figure 4:
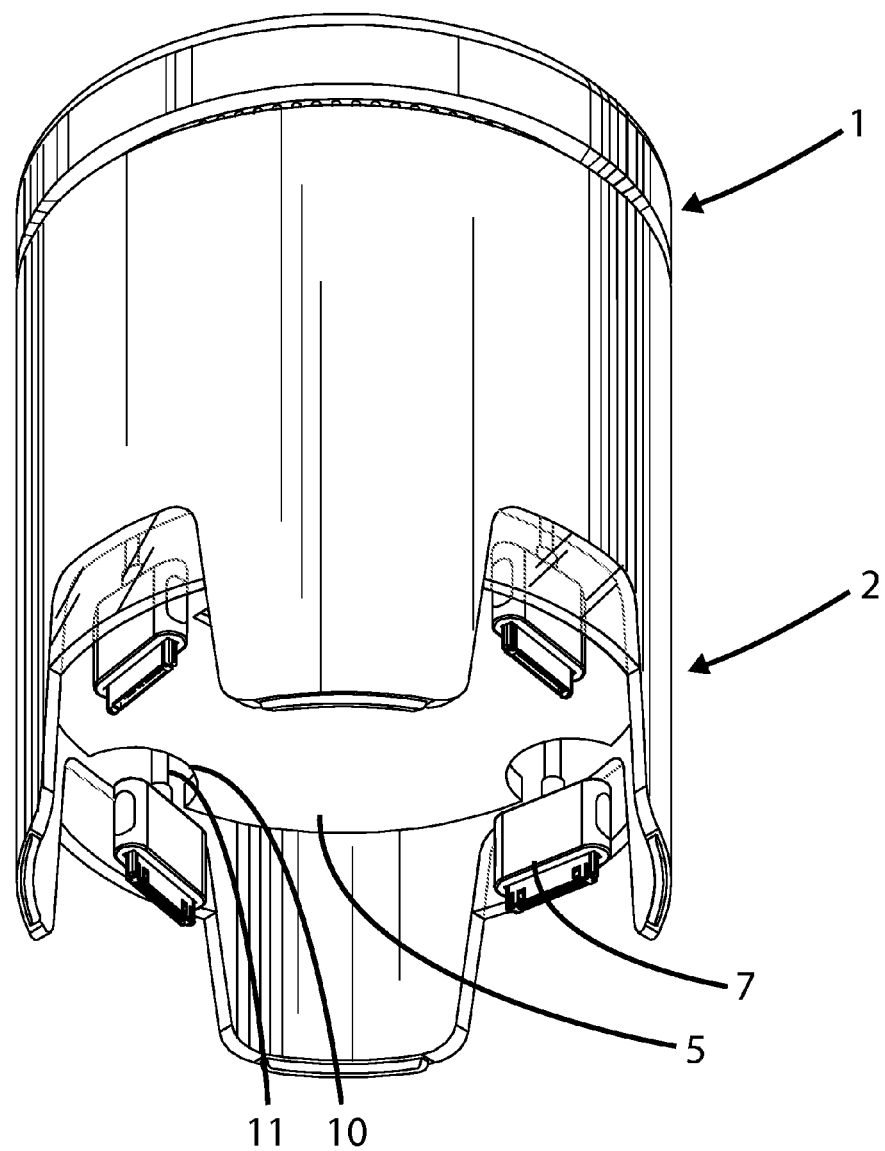
FIG. 4. represents a perspective view from below of mobile charging device according to an aspect of the present disclosure.

FIG. 4 shows a perspective view from below of mobile charging device according to an aspect of present disclosure. Under Carriage 5 has four Cord Apertures 10, which provide passage of Retractable Cord 11 from the retractable cord reel (not shown) stored within Housing 2, so user may extend and retract Retractable Cord 11. Attached to the end of Retractable Cord 11 is Dual Tip Charging Head 7.

Figure 5:
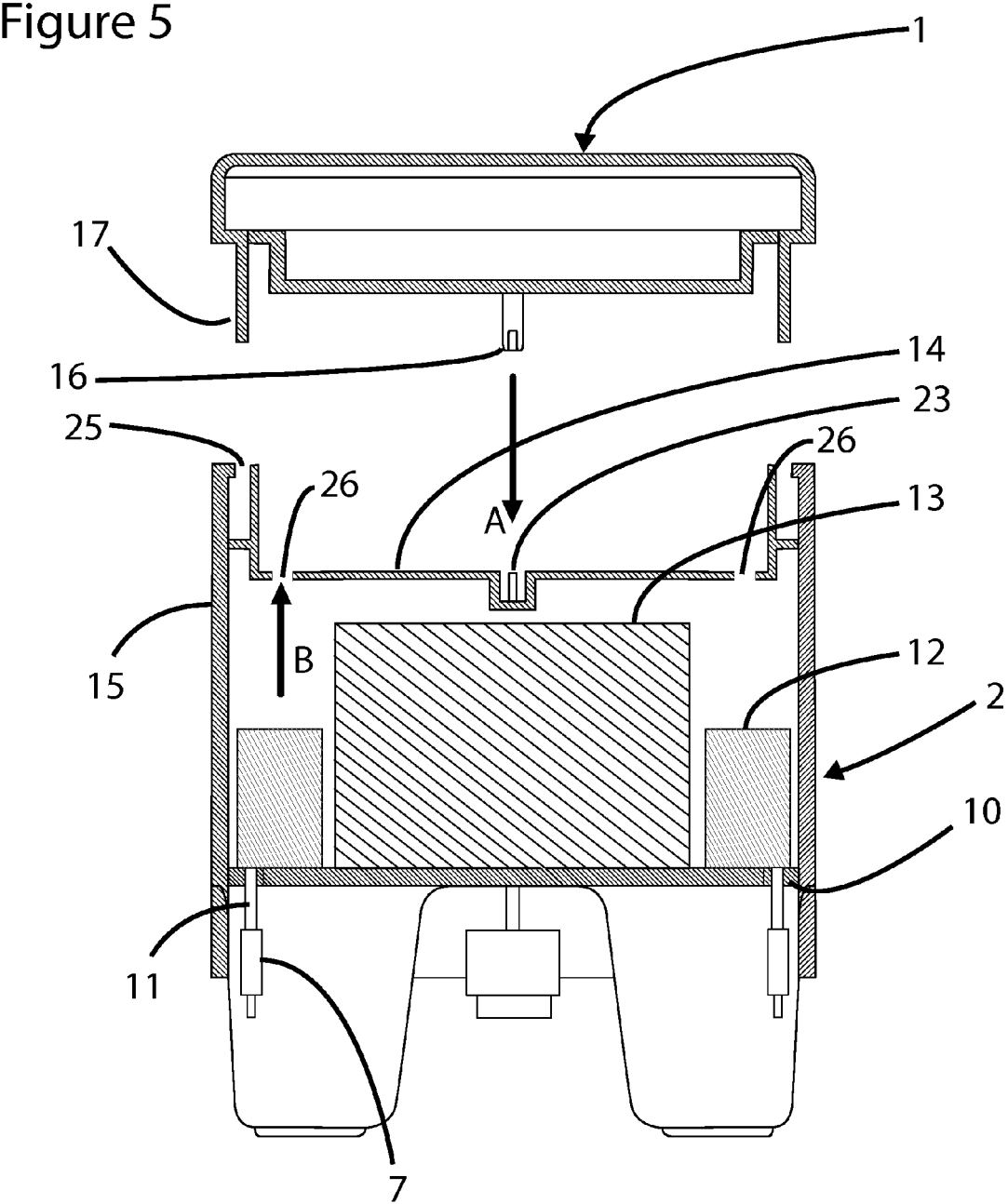
FIG. 5. represents a cross-sectional partially exploded side view of mobile charging device according to an aspect of the present disclosure.

FIG. 5 shows a cross-sectional view of mobile charging device according to an aspect of present disclosure. In this view, Top 1 is removed from Housing 2. Male portion of Top Interior Wall 17 engages female portion and flange 25, to secure Top 1 to Housing 2. In so doing, Top 1 becomes electrically coupled to the battery (not shown) through the connection of AC Adaptor 16 to AC Adaptor Port 23. Direction of Arrow A displays how connection is made between AC Adaptor Port 9 and AC Adapter 16 when connecting Top 1 to Housing 2. AC Adaptor Port 9 (not shown) connects to Battery 13 which provides power to Top 1. Battery 13 may be, in non-limiting examples, lithium ion or lithium polymer. Within compartment 14 is Aperture 26, which facilitates air flow and heat dissipation through Housing 2. The direction of Arrow B indicates the flow of air as described in more detail below in connection with FIG. 7. In one aspect of the present disclosure, Housing 2 contains Storage Compartment 14 that may have space to store one or more charging cords and AC adaptor when Top 1 is secured to Housing 2. Retractable Cord Reel 12 allows Retractable Cord 11 to be pulled from Cord Aperture 10 so the user may access Dual Tip Charging Head 7 as needed.

Battery 13 is further electrically connected to LED Indicator 6, downstream USB Ports 8, and Dual Tip Charging Heads 7 via Retractable Cord 11.

Figure 6:
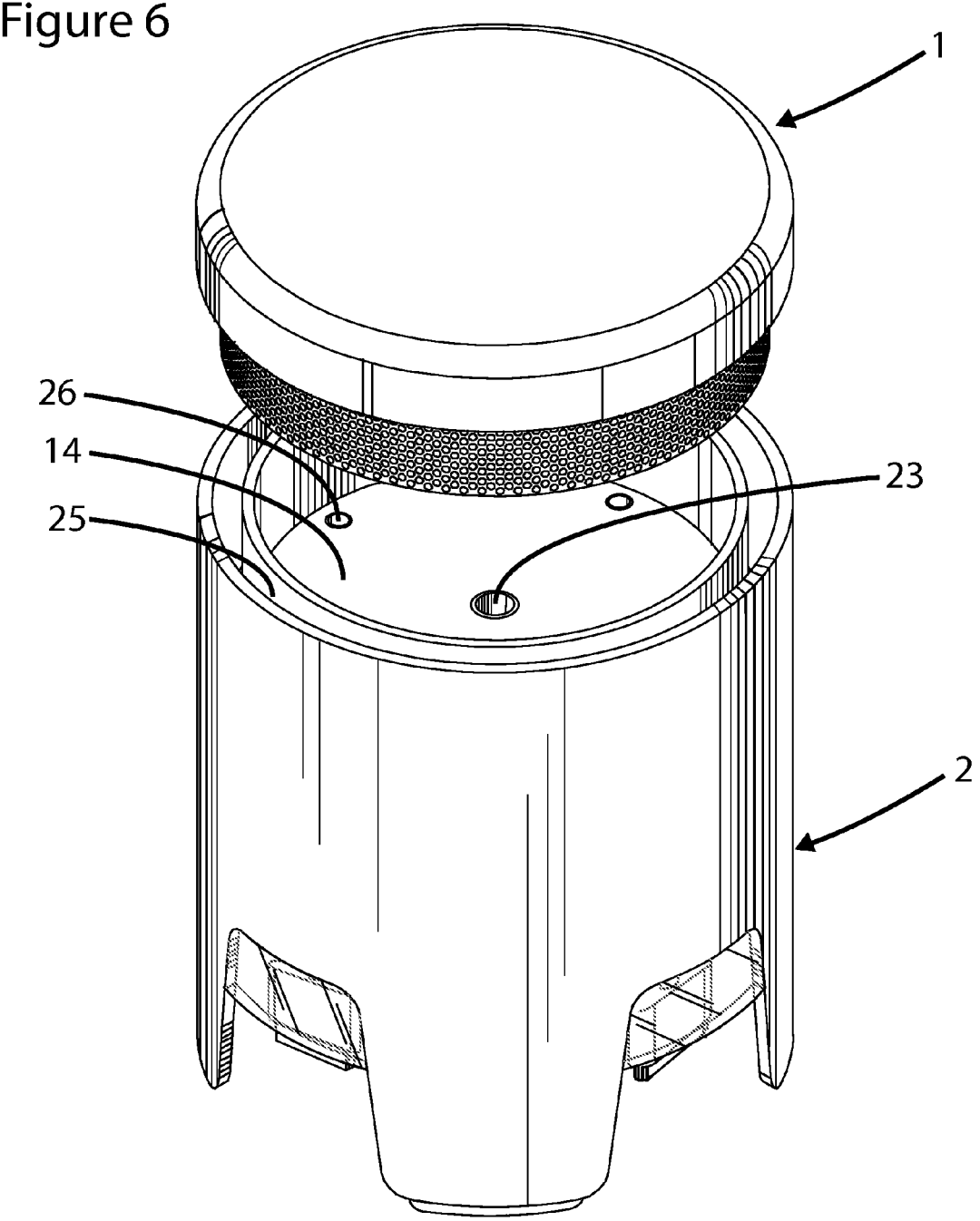
FIG. 6. represents a partially exploded perspective view from above of mobile charging device according to an aspect of the present disclosure.

FIG. 6 shows a perspective view from above of mobile charging device according to an aspect of present disclosure. In this aspect, Top 1 is detached from Housing 2. Within Housing 2 is Storage Compartment 14. On the interior surface of Storage Compartment 14 is Aperture 26 and AC Adaptor Port 23, which provides power from Battery 13 to AC Adaptor 16 located on the under side of Top 1.

Figure 7:
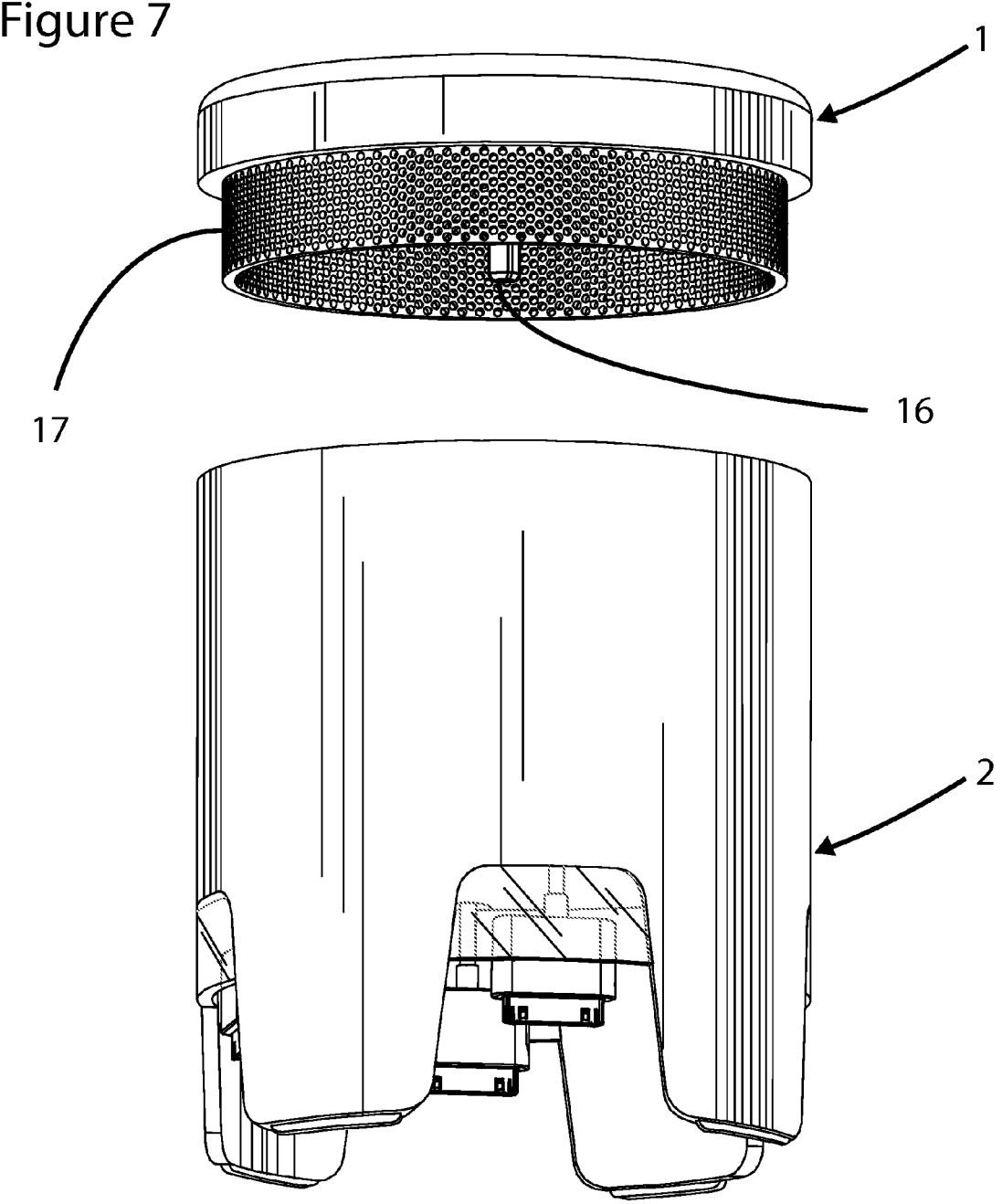
FIG. 7. represents a partially exploded perspective view from below of mobile charging device according to an aspect of the present disclosure.

FIG. 7 shows a perspective view from below of mobile charging device according to an aspect of present disclosure. Interior Wall 17 may be plastic or aluminum and may be perforated to provide increased air flow around Battery 13 to help dissipate heat. Air may flow into Housing 2 through apertures 10 of Under Carriage 5, then air may be heated by Battery 13 and internal electronics (not shown), then rise and flow around Battery 13 and out Aperture 26. Air may then flow through Storage Compartment 14 and out Top 1 via perforations of Interior Wall 17. Top 1 may be outfitted with AC Adaptor 16 and/or other adaptors so Top 1 may have multiple functions that involve electricity, such as speaker phone, solar power collector, or power converter depending on the users needs. Top 1 may connect to Housing 2 in a consistent and modular fashion regardless of the functionality built into Top 1.

Figure 8:
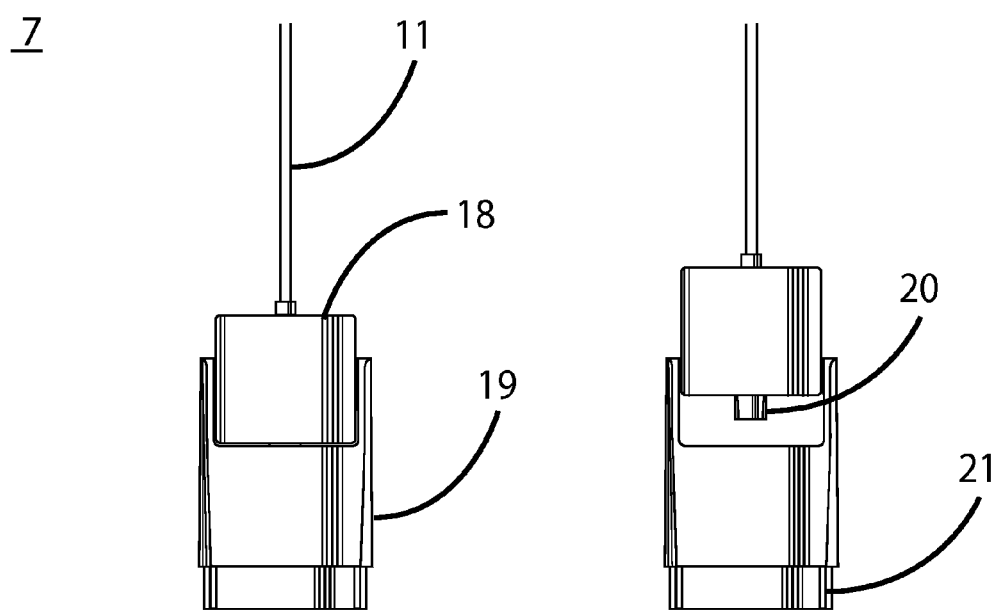
FIG. 8. represents a front view of dual tip charging head in the open and closed positions according to an aspect of the present disclosure.

FIG. 8 shows front views of Dual Tip Charging Head 7 in the open and closed position according to an aspect of present disclosure. Retractable Cord 11 is connected to Micro USB Body 18. In the closed position, Micro USB Adaptor 20 is plugged into 30-Pin Body 19, thus providing power to charge devices via 30-Pin Adaptor 21. In the open position, Micro USB Adaptor 20 is disconnected from 30-Pin Body 19, thus providing power via Micro USB Adaptor 20. Such Dual Tip Charging Heads 7 are commercially available.

Figure 9:
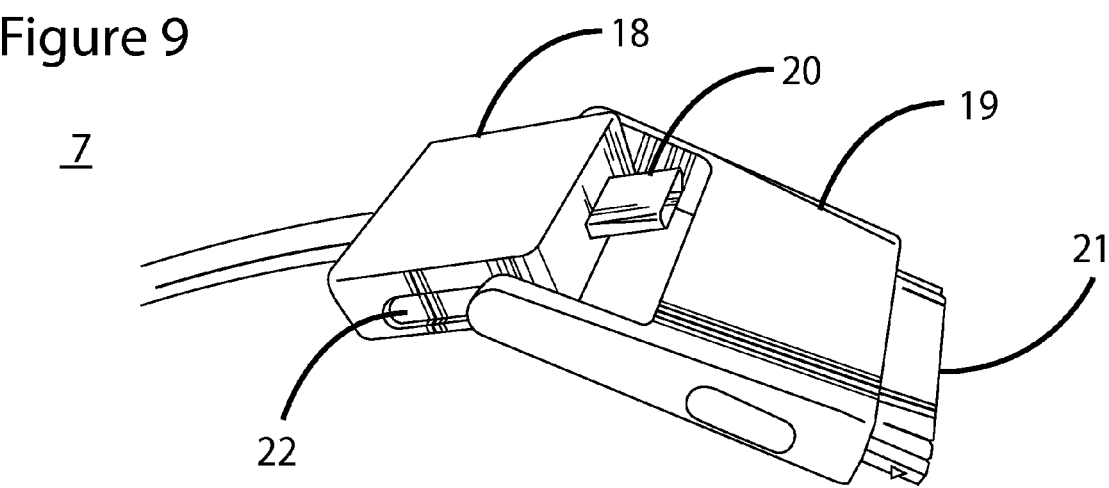
FIG. 9. represents a perspective view of dual tip charging head in the open position according to an aspect of the present disclosure.

FIG. 9 shows a perspective view of Dual Tip Charging Head 7 in the open position according to an aspect of present disclosure. On opposing sides of Micro USB Body 18 are Tracks 22. Tracks 22 are connected to 30-Pin Body 19, which allows for Micro USB Adaptor 20 to be disconnected from 30-Pin Body 19, which can be repositioned to provide access to USB Adaptor 20.

Numerous additional modifications and variations of the present disclosure are possible in view of the above teachings. It is therefore to be understood that within the scope of the appended claims, the present disclosure may be practiced other than as specifically described herein.

The invention claimed is:

1. A charger for charging electronic devices, comprising:
   a top having a perforated portion;
   a housing comprising:
      a rechargeable battery contained within the housing;
      one or more cables electrically coupled to the battery and at least partially contained within the housing;
      one or more cable retractors contained within the housing for retracting a substantial portion of the one or more cables inside the housing via openings on a bottom surface of the housing, where an end of the cable includes a charging head that is not retracted into the housing;
      a power port on the bottom surface of the housing coupled to the rechargeable battery, the power port electrically and mechanically coupleable to an external electrical power source;
      two or more legs extending from the housing supporting the charger on a surface;
      one or more windows arranged between the legs that extend only partially toward the surface such that the cables and charging head may pass through the space between the windows and the surface when the cables are in an extended state, the windows formed of a material that is at least semi-transparent such that the charging heads are visible through the windows when the cables are in a retracted state;
      wherein the top is removably mechanically coupled to the housing, thereby forming a storage area accommodating at least one three-foot charging cable and one three-foot external power connector, and wherein the perforated portion of the top allows heat to pass outward from battery.

2. The charger of claim 1, wherein the head is a dual-tip head having both micro USB and 30-pin connectors.

3. The charger of claim 1, where the top becomes electrically coupled to the housing when the top is mechanically coupled to the housing.

4. The charger of claim 1, further comprising one or more charging indicators on the bottom surface of the housing.

5. The charger of claim 1, further comprising one or more ports on the bottom surface of the housing electrically coupled to the battery.

* * * * *